US012583411B1

(12) United States Patent

Horton et al.

(10) Patent No.: US 12,583,411 B1
(45) Date of Patent: Mar. 24, 2026

(54) SIDE AIRBAG COVER

(71) Applicant: ZF Passive Safety Systems US Inc., Washington, MI (US)

(72) Inventors: Uriah Horton, North Branch, MI (US); Daniel Rodriguez, Rochester Hills, MI (US)

(73) Assignee: ZF Passive Safety Systems US Inc., Washington, MI (US)

( * ) Notice: Subject to any disclaimer, the term of this patent is extended or adjusted under 35 U.S.C. 154(b) by 0 days.

(21) Appl. No.: 19/032,152

(22) Filed: Jan. 20, 2025

(51) Int. Cl.
| | |
|---|---|
| B60R 21/217 | (2011.01) |
| B60R 21/0136 | (2006.01) |
| B60R 21/207 | (2006.01) |
| B60R 21/01 | (2006.01) |

(52) U.S. Cl.
CPC ...... B60R 21/2176 (2013.01); B60R 21/0136 (2013.01); B60R 21/207 (2013.01); *B60R 2021/01204* (2013.01); *B60R 2021/2076* (2013.01)

(58) Field of Classification Search
CPC .......................... B60R 21/2176; B60R 21/207
See application file for complete search history.

(56) References Cited

U.S. PATENT DOCUMENTS

| | | | | |
|---|---|---|---|---|
| 8,764,049 | B2 * | 7/2014 | Lusk | B60R 21/207 |
| | | | | 280/730.2 |
| 8,840,139 | B1 * | 9/2014 | Borton | B60R 21/2346 |
| | | | | 280/740 |
| 11,260,822 | B2 * | 3/2022 | Nagata | B60R 21/23138 |
| 11,292,414 | B2 * | 4/2022 | Schaefer | B60R 21/217 |
| 11,299,120 | B1 * | 4/2022 | Morita | B60R 21/207 |
| 11,897,410 | B2 * | 2/2024 | Perales-Huerta | B60R 21/231 |
| 2020/0101932 | A1 * | 4/2020 | Ota | B60R 21/23138 |

FOREIGN PATENT DOCUMENTS

| | | | | |
|---|---|---|---|---|
| JP | 2014227004 A | * | 12/2014 | |
| JP | 2020050239 A | * | 4/2020 | B60R 21/207 |

* cited by examiner

*Primary Examiner* — Faye M Fleming
(74) *Attorney, Agent, or Firm* — Tarolli, Sundheim, Covell & Tummino LLP

(57) ABSTRACT

A soft cover for packaging an assemblage of an inflator and a side airbag in a stored condition to form an airbag module for installation in a vehicle, The soft cover is formed as a sheet of material including a central portion configured to form a loop that encircles the inflator and side airbag. A first end portion of the sheet extends from the central portion and is configured to wrap over the inflator and side airbag, closing a first open end of the loop formed by the central portion. The first end portion includes an inflator connector opening configured to be fitted over a connector housing of the inflator, leaving the inflator connector housing exposed outside the airbag module.

17 Claims, 5 Drawing Sheets

SIDE AIRBAG COVER

TECHNICAL FIELD

This disclosure to an inflatable apparatus for helping to protect a vehicle occupant in the event of a side impact to the vehicle and/or a vehicle rollover. More specifically, this disclosure relates to a cover for a side airbag.

BACKGROUND

It is known to inflate an inflatable vehicle occupant protection device to help protect a vehicle occupant. One particular type of inflatable vehicle occupant protection device is a side airbag. Side airbags can be configured for outboard protection, i.e., configured to help protect the occupant from impacts with the side structure of the vehicle. Side airbags can also be configured for inboard protection, i.e., configured to help protect the occupant from impacts with a center console or an adjacent seat and/or occupant of the vehicle. A known side airbag is inflated with inflation fluid directed from an inflator to the side airbag.

In certain configurations, the side airbag and the inflator are components of an airbag module that is mounted in a vehicle seat. Specifically, the side airbag module can be mounted to a seat frame in a seatback of the vehicle seat. In one example configuration, the side airbag is attached to the inflator, the airbag is rolled and/or folded, and then wrapped in a soft packaging, such as a fabric wrap, to package the airbag and form the airbag module ready for installation in the seat. The airbag module is then installed in the vehicle seat, for example, by mounting the module to the seat frame on the inboard/outboard side of a seatback, depending on the intended purpose, i.e., inboard or outboard protection. The side airbag, when inflated, deploys out of the seatback to an inflated and deployed condition in which the side airbag is positioned between the seated occupant and the side structure of the vehicle (for an outboard protection configuration), or between the seated occupant and the center console and/or adjacent seat/occupant (for an inboard protection configuration).

Because the side airbag module is mounted inside the vehicle seat, the seat is configured to permit the side airbag to deploy outside its confines. Additionally, the airbag module, i.e., the soft packaging is configured to open to permit the airbag to inflate and deploy. Typically, the soft packaging is formed with tear seams that rupture in response to airbag expansion as it inflates. Similarly, the seat is configured with internal passageways and/or rupturable portions configured to allow the deploying airbag to exit the confines of the seat. These can include, for example, passageways formed in the seat foam and tear seams formed in the seat cover.

In order to protect the occupant, the side airbag must inflate and deploy quickly. Side impacts develop rapidly, and side airbags are typically required to deploy into position within 10-20 milliseconds after the impact is sensed. Accordingly, the packaging of the airbag module, i.e., the roll/fold of the airbag and the opening of the soft packaging are configured so that the deployment characteristics of the airbag meet these requirements.

Because the side airbag inflates and deploys so rapidly, the forces that the airbag and other components experience can be immense. As a result, care must be exercised so as to avoid damage that can compromise airbag performance. This damage can occur both during deployment or beforehand, for example, during installation and/or handling of the airbag module. Even damage that might be considered minor can be consequential, given the extreme forces undergone during deployment. The configuration of the airbag module, particularly, the packaging material, can be configured to avoid damage during handling or installation.

In fact, certain design criteria call for the airbag module being subjected to testing to ensure that the module is robust and can withstand certain events without damage. An example of this is what is referred to as a drop test. According to these drop tests, the module is dropped from a certain height onto a specified surface, such as a steel plate. The module components are then inspected for damage that might compromise the performance of the airbag module. Damage can occur, for example, when portions of the airbag are impacted or pinched between the drop surface and the inflator.

SUMMARY

A side airbag module includes a side airbag packaged in a soft cover. The side airbag module also includes an inflator for inflating the side airbag. The side airbag module is configured to be mounted to a seat frame in a seatback of the vehicle. The side airbag module has a packaged condition in which the airbag is deflated, rolled and/or folded, and packaged in the soft cover along with the inflator. The airbag module is concealed within the seatback behind the seat covering and foam or other padding material. The seat covering has a tear seam that ruptures in response to inflation of the airbag, which forms a deployment opening through which the airbag deploys.

The soft cover is configured to block the airbag from engaging certain portions of the inflator prior to deployment. In an example configuration, the soft cover includes a flap configured to wrap around a connector housing located at an axial end of the inflator. The connector housing houses the electrical connectors that facilitate connecting the inflator to wiring from the airbag controller. The flap includes a connector opening configured to fit over the connector housing and an aperture configured to fit over an inflator mounting stud protruding from the inflator body. The soft cover can be configured so that fitting the aperture over the mounting stud secures the connector opening on the connector housing.

According to one aspect, a soft cover for packaging an assemblage of an inflator and a side airbag in a stored condition to form an airbag module for installation in a vehicle, The soft cover is formed as a sheet of material including a central portion configured to form a loop that encircles the inflator and side airbag. A first end portion of the sheet extends from the central portion and is configured to wrap over the inflator and side airbag, closing a first open end of the loop formed by the central portion. The first end portion includes an inflator connector opening configured to be fitted over a connector housing of the inflator, leaving the inflator connector housing exposed outside the airbag module.

According to another aspect, the soft cover can include a second end portion extending from the central portion, opposite the first end portion. The second end portion can be configured to wrap over the inflator and side airbag, closing a second open end of the loop formed by the central portion, opposite the first open end of the loop formed by the central portion.

According to another aspect, central portion can include a first flap and a second flap. The first and second flaps can be configured to wrap around the inflator and side airbag in opposite directions so that the central portion forms the loop that encircles the inflator and side airbag. The first flap can include a mounting stud opening configured to be fitted over an inflator mounting stud to secure the first flap to the airbag module. The second flap can include a mounting stud opening configured to be fitted over an inflator mounting stud to secure the second flap to the airbag module.

According to another aspect, the inflator can include a pair of mounting studs, and the first and second flaps each can include a tab portion and a pair of mounting stud openings that extend through the tab portion. The mounting stud openings can be configured to be fitted over the mounting studs with the tab portions overlying each other to secure the loop formed by the central portion to the assemblage of the inflator and side airbag.

According to another aspect, the first end portion can include a third flap configured to wrap over the inflator and side airbag, closing the first open end of the loop formed by the central portion. The third flap can include a mounting stud opening configured to be fitted over an inflator mounting stud to secure the third flap and to prevent the inflator connector opening of the third flap from being removed from the connector housing.

According to another aspect, the third flap can include a tab portion through which the mounting stud opening extends.

According to another aspect, the second end portion can include a fourth flap configured to wrap over the inflator and side airbag, closing the second open end of the loop formed by the central portion. The fourth flap can include a mounting stud opening configured to be fitted over an inflator mounting stud to secure the fourth flap.

According to another aspect, the fourth flap can include a tab portion through which the mounting stud opening extends.

According to another aspect, the third and fourth flaps each can include a curved upper edge extending from the central portion and curving down toward their respective mounting stud openings.

According to another aspect, the soft cover can include one or more tear seams that extends across the central portion of the soft cover, along a boundary between the central portion and the first end portion, and along the boundary between the central portion and the second end portion.

According to another aspect, the central portion can include one or more cutouts configured to leave the inflator connector housing exposed from the loop that encircles the inflator and side airbag to facilitate fitting the inflator connector opening of the first end portion onto the inflator connector.

According to another aspect, the airbag can include a mouth portion in which the inflator is installed, a central portion that corresponds to the length of the inflator, an upper portion extending above the central portion, and a lower portion extending below the central portion. The upper and lower portions, in the stored condition, are rolled and/or folded toward the central portion, and wherein central portion and the rolled and/or folded upper and lower portions are rolled and/or folded toward the inflator to place the side airbag in the stored condition.

According to another aspect, a side airbag module includes a side airbag, an inflator, and the soft cover described herein. The central portion of the soft cover forms a loop that encircles the inflator and side airbag. The first end portion wraps over the inflator and side airbag with the inflator connector opening fitted over the connector housing of the inflator, leaving the inflator connector housing exposed outside the airbag module.

According to another aspect, the side airbag module can also include a diffuser secured to the inflator. The loop of the central portion can also encircle the diffuser, and the first end portion can wrap over the inflator and diffuser.

According to another aspect, the inflator can include mounting studs configured to mount the side airbag module to a vehicle seat.

According to another aspect, a vehicle safety system can include the airbag module. The vehicle safety system can also include a sensor for sensing vehicle conditions, and a controller that is operative to receive a signal from the sensor that is indicative of the sensed vehicle conditions. The controller can be configured to evaluate the signal from the sensor to identify vehicle crash conditions and to control the actuation of the inflator to inflate and deploy the side airbag in response to the identified vehicle crash conditions.

According to an aspect of the vehicle safety system, the airbag module can be configured to be mounted in a seatback of a vehicle seat.

DRAWINGS

The foregoing and other features of the present disclosure will become apparent to one skilled in the art to which the present disclosure relates upon consideration of the following description with reference to the accompanying drawings, in which.

DESCRIPTION

Figure 1:
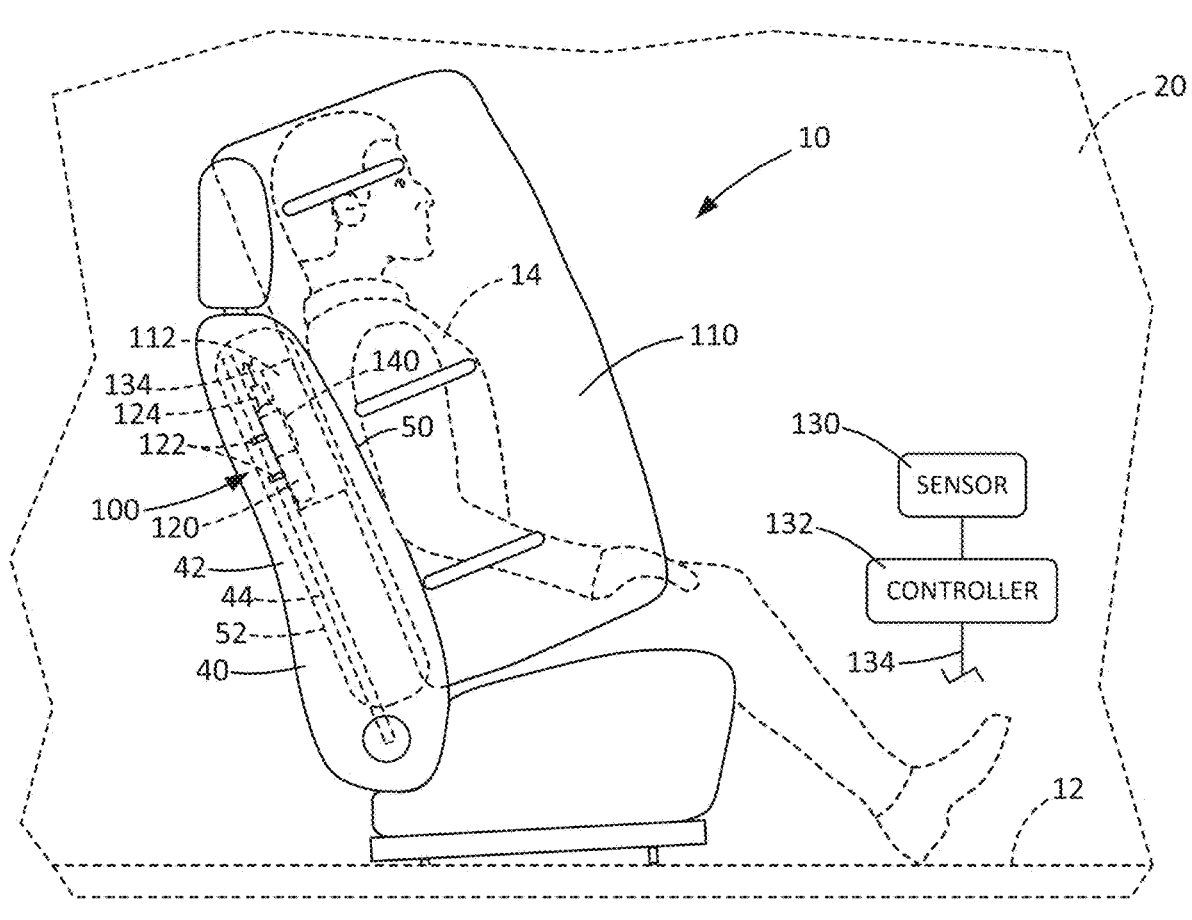
FIG. 1 is a side view illustrating a vehicle seat and a vehicle safety system including a side airbag in an inflated and deployed condition, according to an example configuration.

An example configuration of an apparatus 10 helps to protect an occupant 14 of a vehicle 12. As shown in FIG. 1, according to one example configuration, the apparatus 10 includes a side airbag module 100 that includes an inflatable vehicle occupant protection device in the form of a side airbag 110. The side airbag 110 of the example configuration illustrated in FIG. 1 is inflatable between the occupant 14 and a side structure 20 of the vehicle 12 which can, for example, include pillars, side door(s), and window(s)/window opening(s).

The vehicle 12 also includes a seat 40 upon which the occupant 14 can be seated. The seat 40 can be located in any row of the vehicle, i.e., a first/front row seat, a second row seat, third row seat, or a vehicle seat of any other row. Additionally, the seat can be located on a driver side or passenger side of the vehicle. Further, while the side airbag module 100 is illustrated and described herein as being mounted on an outboard side of the seat 40 and being inflatable between the occupant 14 and the side structure 20, the side airbag module could have an inboard mounting configuration in which the side airbag is configured to be inflatable between the seated occupant and a center console and/or an occupant of an adjacent seat.

The side airbag module 100 is configured to be installed in/on the vehicle seat 40. More specifically, the side airbag module 100 is configured to be installed in a seatback 42 of the vehicle seat 40. The side airbag module 100 can, for example, be configured to be connected to a portion of the seat frame 44 that helps form the seatback 42. The side airbag module 100 is configured to be concealed behind an outer covering 50 of the seat 40 when installed. In the installed condition, the side airbag module 100 can also be embedded in, or at least partially surrounded by, seat padding 52, such as a foam cushioning material.

The side airbag 110 includes overlying panels that are interconnected along at least a portion of a perimeter of the side airbag to form a perimeter connection that defines an inflatable volume of the airbag. The side airbag 110 can also include interior connections in which the overlying panels are interconnected within the perimeter to form non-inflatable portions and to help define inflatable chambers of the airbag.

The side airbag 110 can be formed in a variety of manners, such as by weaving the overlying panels in a one piece woven (OPW) construction in which yarns (e.g., nylon yarns) are woven simultaneously to form both one layer and two layer portions of the airbag. The side airbag 110 could alternatively be formed from separately woven panels that are interconnected, for example, by stitching, ultrasonic welding, heat bonding, or adhesives. The side airbag 110 can be coated with a gas impermeable material, such as ure-thane, or laminated with a gas impermeable film. The side airbag 110 thus may have a substantially gas-tight construction. Those skilled in the art will appreciate that alternative materials, such as polyester yarn, and alternatives coatings, such as silicone, can also be used to construct the side airbag 110.

Figure 2:
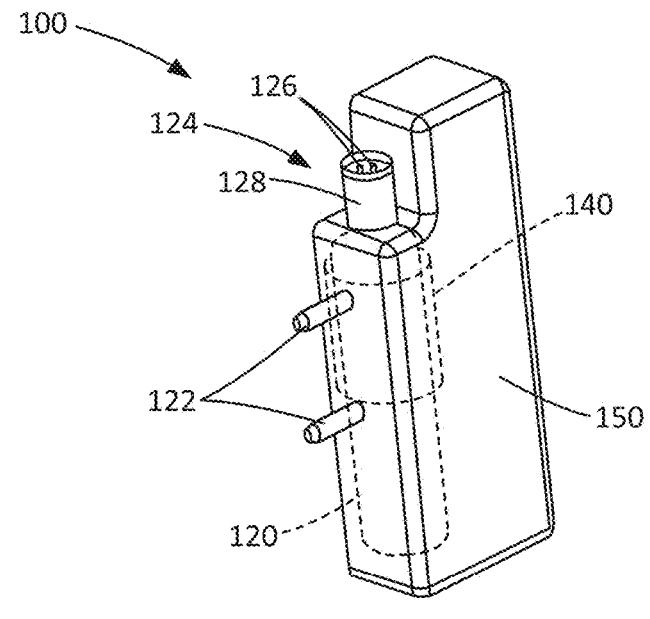
FIG. 2 is a perspective view of a side airbag module configured to be mounted in the vehicle seat of FIG. 1.

Referring to FIGS. 1-2, in addition to the side airbag 110, the side airbag module 100 also includes an inflator 120, a diffuser 140, and a soft cover 150. To assemble the side airbag module 100 for installation in the vehicle 12, the diffuser 140 is assembled onto the inflator 120, and the assemblage of the inflator and diffuser is positioned in a mouth portion 112 of the side airbag 110. In the installed condition, inflator mounting studs 122 that protrude from the inflator 120 extend through corresponding openings (not shown) of the side airbag 110. Also, in the installed condition, the diffuser 140 is positioned in the mouth portion 112 of the side airbag 110 and is configured to diffuse the inflation fluid discharged from the inflator and direct the diffused inflation fluid into the side airbag. The side airbag 110 is rolled and/or folded in a predetermined manner and packaged in the soft cover 150, as shown in FIG. 2.

In the packaged condition, the mounting studs 122 protrude from the soft cover 150 and can be used to secure airbag module 100 in the vehicle. A portion of the inflator 120, specifically an electrical connector 124, also protrudes from the soft cover 150. As shown in FIG. 2, the electrical connector 124 comprises an electrical receptacle that includes conductors 126, such as pins, housed within a housing 128. The electrical connector 124 is configured to receive a mating connector of vehicle wiring 134 (see, e.g., FIG. 1) to allow a remotely located airbag controller to control actuation of the inflator and inflation/deployment of the side airbag.

To install the assembled airbag module 100, the module is maneuvered so that the mounting studs 122 extend through corresponding openings in the seat frame portion 44 of the seatback 42. Threaded fasteners, such as hexagonal nuts, along with any other components, such as washers, etc., are installed on the mounting studs 122, and tightened to secure the airbag module 100 to the seat frame. When the airbag module 100 is secured to the seat frame 44 via the mounting studs 122, the assemblage airbag module 100 is fixed, i.e., the side airbag 110, inflator 120, and soft cover 150 are connected or locked together via the mounting studs 122 and cannot be separated.

To accommodate its installation on the seat frame 44 within the seat padding 52 behind the seat cover 50, the airbag module 100 must be configured so that the side airbag 110 can inflate and deploy to the desired position along the side structure 20, between the seat 40 and/or occupant 14 and the side structure. This is not a trivial matter, as there are several challenges to account for and overcome. For example, in an outboard installation, there is very little space between the seatback 42 and the side structure 20. Notwithstanding this, the side airbag 110 needs to deploy along a trajectory that causes it to deploy along or engaging the side structure, so its deployment trajectory must be both reliable and repeatable. Additionally, because there is little space between the seat 40 and the side structure 20, it will be appreciated that the seated occupant 14 is also positioned close to the side structure. Due to this close spacing, in the event of a side crash event, the side airbag 110 needs to be deployed, i.e., inflated, to the desired position and pressurization, quickly, because the time between the occurrence of the crash event and the occupant impacting the side structure 20 will be short.

It should be understood and appreciated that these considerations are not limited to outboard seat installations, as inboard installations present the same or similar considerations. For example, an inboard installation of the side airbag module 100 must produce a precise inflation and deployment of the side airbag between the occupant 14 and the center console and/or the adjacent occupant in order to offer occupant protection within the short time windows described hereinabove.

Figures 3A, 3B, 3C:
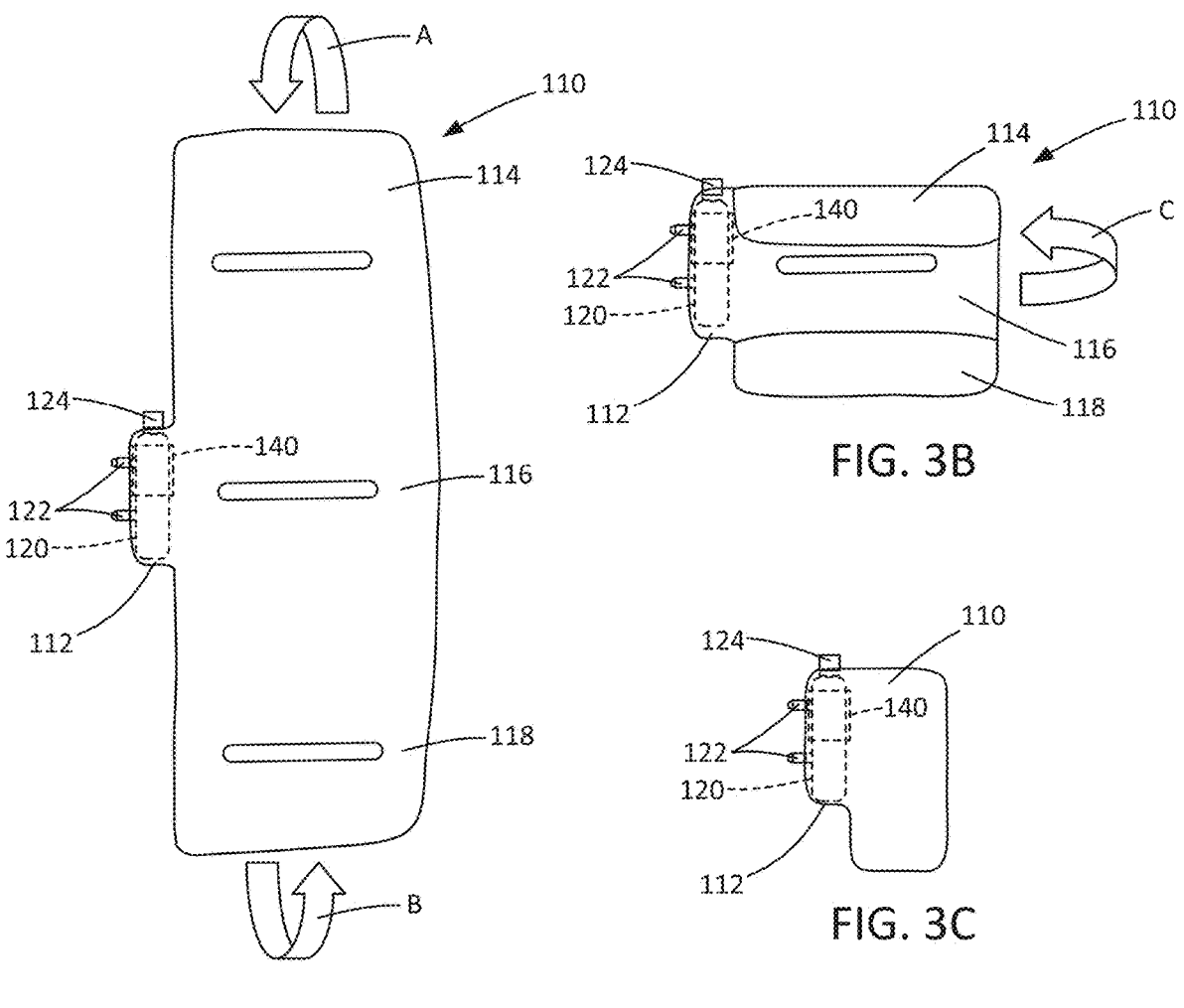
FIGS. 3A-3C are plan views illustrating a method by which a side airbag of the side airbag module is placed in a rolled/folded condition.

An example of the manner in which the side airbag 110 is placed in the stored condition is illustrated in FIGS. 3A-3C. The stored condition of the side airbag 100 is that in which the airbag is ready for packaging in the soft cover 150. Referring to FIG. 3A, the inflator 120 is positioned in the mouth portion 112 of the side airbag 110, with the connector housing 128 and the mounting studs 122 protruding from respective openings in the airbag/mouth portion.

As shown in FIG. 3A, an upper portion 114 of the side airbag 110 can be rolled in a direction indicated generally by the arrow labeled A (downward as viewed in FIG. 3A) toward a middle portion 116 of the airbag that coincides generally with the location of the mouth portion 112 and inflator 120. Additionally, a lower portion 118 of the side airbag 110 can be rolled in a direction indicated generally by the arrow labeled B (upward as viewed in FIG. 3A) toward the middle portion 116 of the airbag. Although the upper and lower portions 114, 118 are described herein as being placed in the stored condition by rolling in the directions indicated by arrows A and B, it should be appreciated that the upper and lower portions could be placed in the stored condition by rolling the upper and lower portions in different directions, by folding the upper and lower portions in one or more directions, or by any other method. Rolling/folding the upper and lower portions 114, 118 places the side airbag 110 in the condition shown in FIG. 3B.

Referring to FIG. 3B, the middle portion 116 of the side airbag 110, along with the rolled/folded upper and lower portions 114, 118, can be rolled in a direction indicated generally by the arrow labeled C (to the left as viewed in FIG. 3A) toward the mouth portion 112/inflator 120. Although these portions are described herein as being placed in the stored condition by rolling in the direction indicated by arrow C, it should be appreciated that these portions could be placed in the stored condition by rolling in different directions, by folding in one or more directions, or by any other method. Rolling/folding these portions 114, 116, and 118 places the side airbag 110 in the stored condition, ready for application of the soft cover 150. The stored condition of the side airbag 110 and inflator 120 is shown in FIG. 3C.

Figure 4A:
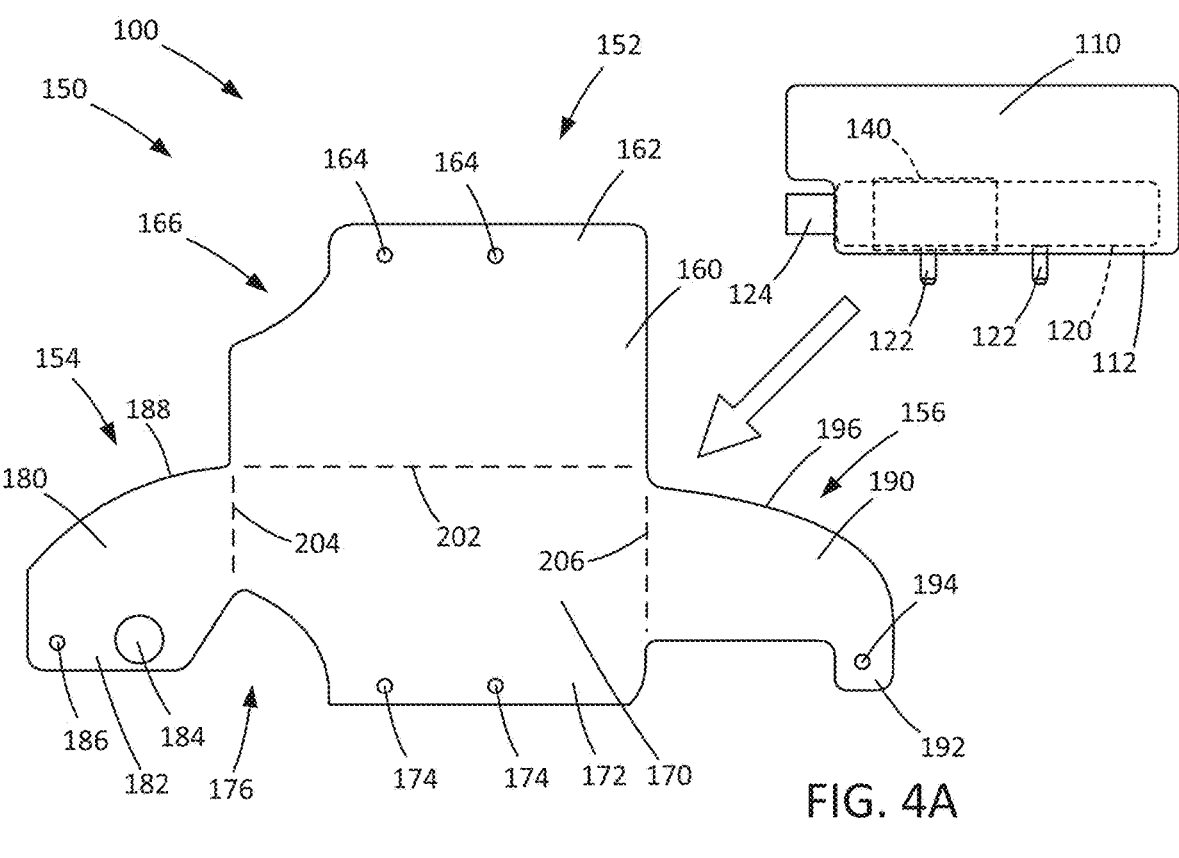
FIGS. 4A-4E are plan views illustrating a soft cover for packaging the rolled/folded side airbag and a method by which the soft cover is applied in order to package the side airbag.

The manner in which the assemblage of the inflator 120 and side airbag 110 is packaged in the soft cover 150 to form the airbag module 100 is illustrated in FIGS. 4A-4E. Referring to FIG. 4A, the soft cover 150 includes a central portion 152, a first end portion 154, and an opposite second end portion 156. The central portion 152 includes a portion forming a first flap 160 and a portion forming a second flap 170. The first end portion 154 extends from one end of the central portion 152 and forms a third flap 180. The second end portion 156 extends from an opposite end of the central portion 152 and forms a fourth flap 190.

The soft cover 150 includes a plurality of tear seams that are rupturable in response to deployment of the side airbag 110. A first tear seam 202 extends across the central portion 152 of the soft cover 150 and defines, generally, the boundary between the first flap 160 and the second flap 170. A second tear seam 204 extends, generally, along the boundary between the central portion 152 and the first end portion 154. A third tear seam 206 extends, generally, along the boundary between the central portion 152 and the second end portion 156.

The first flap 160 is generally rectangular, except that a cutout 166 is formed at one corner. The first flap 160 includes an edge portion or tab 162 that includes a pair of spaced stud receiving openings 164. Similarly, the second flap 170 is generally rectangular, except that a cutout 176 is formed at one corner, essentially mirroring the cutout 166 of the first flap 160. The second flap 170 includes an edge portion or tab 172 that includes a pair of spaced stud receiving openings 174.

The fourth flap 190 extends from a first end of the central portion 152, specifically a first end of the second flap 170. The fourth flap 190 has a curved upper edge 196 and a tab 192 that extends from a lower edge of the fourth flap. The tab 192 includes a stud receiving opening 194. The third flap 180 extends from a second end of the central portion 152, opposite the first end. Specifically, the third flap 180 extends from a second end of the second flap 170, opposite the first end of the second flap. The third flap 180 has a curved upper edge 188 and a tab 182 that is defined, in part, by the cutout 176. The tab 182 includes an inflator receiving opening 184 and a stud receiving opening 186.

Figure 4B:
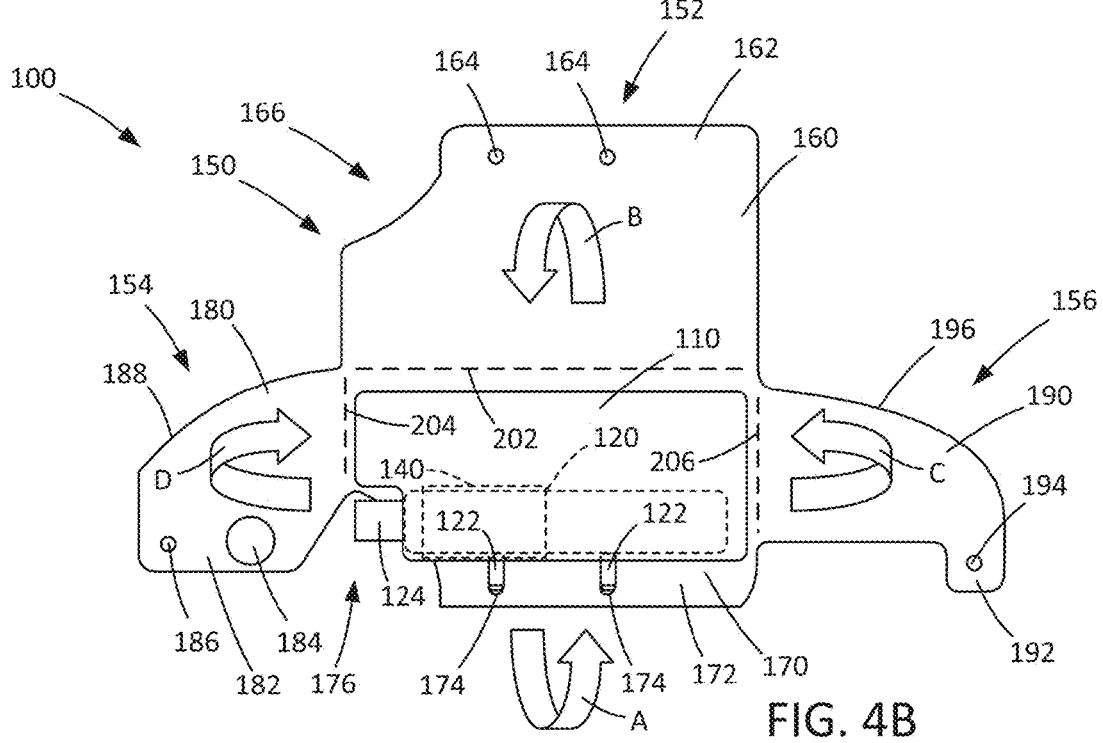

As shown in FIG. 4A, the side airbag 110, in the stored condition with the inflator 120 installed in the mouth portion 112, is moved in the direction of the large arrow in FIG. 4A and positioned on the second flap 170 of the soft cover 150, as shown in FIG. 4B. Once positioned on the soft cover 150, the flaps 160, 170, 180, and 190 are wrapped around the assemblage of the side airbag 110 and inflator 120 to place the airbag in the packaged condition and forming the airbag module 100.

Specifically, the tab 172 of the second flap 170 is folded around the airbag 110 and inflator 120 as indicated generally by the arrow A in FIG. 4B. As this is done, the mounting stud openings 174 on the tab 172 are fitted onto the inflator studs 122. This secures the second flap 170 to the inflator 120/airbag 110. Next, the first flap 160 is folded around the airbag 110 and inflator 120 as indicated generally by the arrow B in FIG. 4B. The first flap 160 is configured to wrap around the airbag 110, with the flap 162 overlying the inflator 120 so that the mounting stud openings 164 can be fitted onto the inflator studs 122. The flap 162 therefore overlies the flap 172, with the central portion 152 of the soft cover 150 forming a loop encircling the airbag 110 and inflator 120, as shown in FIG. 4C.

The central portion 152 of the soft cover can be configured so that positioning the mounting stud openings 164, 174 on the mounting studs 122 causes the central portion to have a close or snug fit with the rolled/folded airbag 110 so that the tabs 162, 172 are retained, resisting their being inadvertently removed. Notably, in this condition, the cutouts 166, 176 of the first and second flaps 160, 170 overlie each other, leaving the inflator connector housing 128 exposed.

Figure 4C:
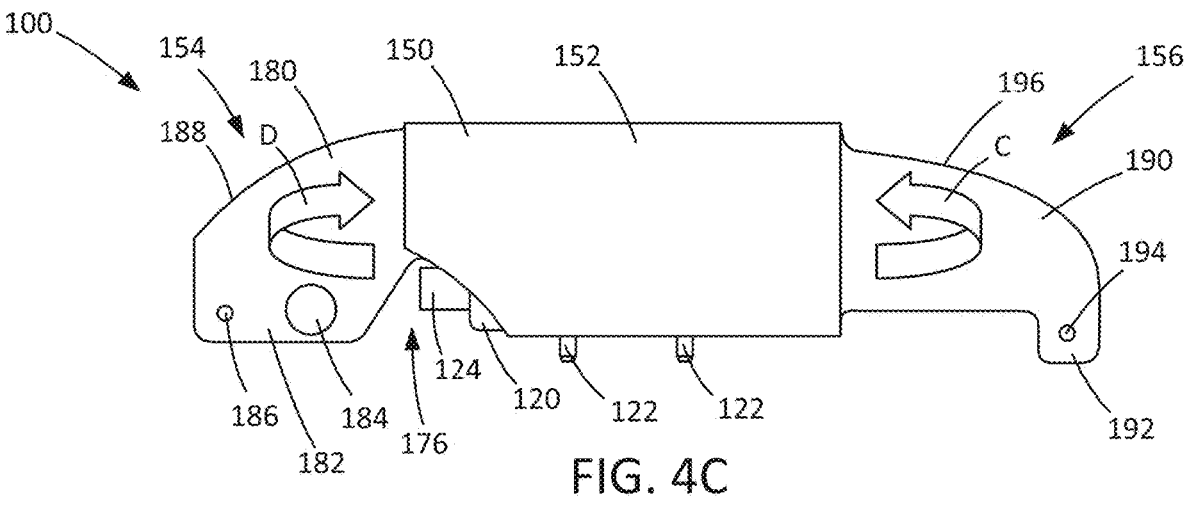

Referring to FIG. 4C, the second end portion 156 is folded over, as indicted generally by arrow C, positioning the fourth flap 190 overlying the central portion 152 of the soft cover 150 and the airbag 110 contained therein, thus closing one end of the loop formed by the central portion. The tab 192 is then folded over and the mounting stud opening 194 is fitted onto the inflator mounting stud 122 closest to the second end portion 156. This places the airbag module 100 in the condition illustrated in FIG. 4D.

Figure 4D:
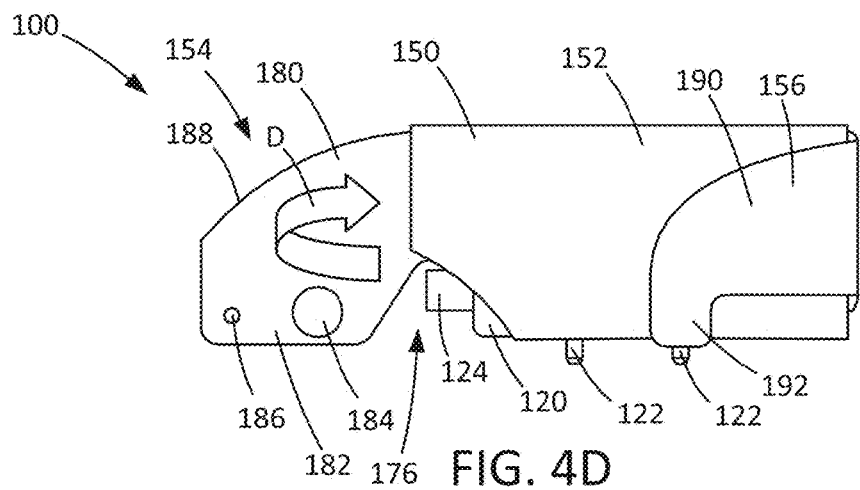
Figure 4E:
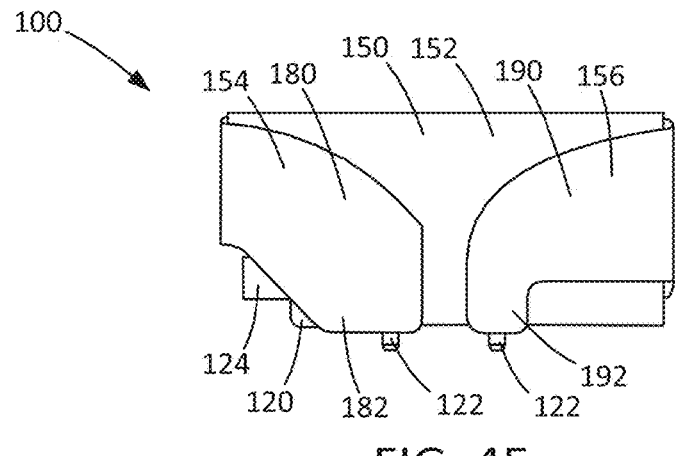

Referring to FIG. 4D, the first end portion 154 is folded over, as indicted generally by arrow D, positioning the third flap 180 overlying the central portion 152 of the soft cover 150 and the airbag 110 contained therein, thus closing the other end of the loop formed by the central portion. The tab 182 is then folded over and the inflator receiving opening 184 is positioned over the inflator connector housing 128. Additionally, the mounting stud opening 186 is fitted onto the inflator mounting stud 122 closest to the first end portion 154. This places the airbag module 100 in the packaged condition illustrated in FIG. 4E.

The third flap 180 is configured so that the inflator receiving opening 184 is retained fitted onto the inflator connector housing 128. Fitting the mounting stud opening 186 onto the inflator mounting stud 122 prevents the tab 182 from being removed from the inflator connector housing 128. Notably, the cutout 176 is configured to be partially defined on the third flap 180 so that the inflator connector housing 128 is left at least partially exposed, even in the packaged condition of the airbag module 100. Tension on the flaps 160, 170, 180, 190 due to the close packaging of the airbag 110 by the soft cover 150 tensions the flaps, which retains their respective apertures 164, 174, 184, 196 on the mounting studs 122. This helps retain the soft cover 150 and maintains the packaging of the airbag module 100. The airbag module 100 can then be installed on the vehicle seat 40.

Referring to FIG. 1, the vehicle 12 includes a crash sensor 130 for sensing the occurrence of an event for which inflation of the side airbag 110 is desired, such as a side impact to the vehicle 12 and/or a vehicle rollover. An airbag controller 132 is operatively connected to the crash sensor 130 and also to the inflator 120 via vehicle wiring 134. The vehicle wiring 134 is terminated with a connector piece configured to mate with components of the electrical connector 124 (i.e., pins 126 and/or housing 128) to secure the vehicle wiring to the inflator and to maintain an electrical connection between the airbag controller 132 and the infla-
tor. Upon sensing, via the crash sensor 130, the occurrence
of an event for which inflation of the side airbag 110 is
desired, the airbag controller 132 provides an electrical
signal to the inflator 120. The electrical signal causes the
inflator 120 to be actuated in a known manner. The inflator
120, when actuated, discharges fluid under pressure into the
side airbag 110.

Figure 5:
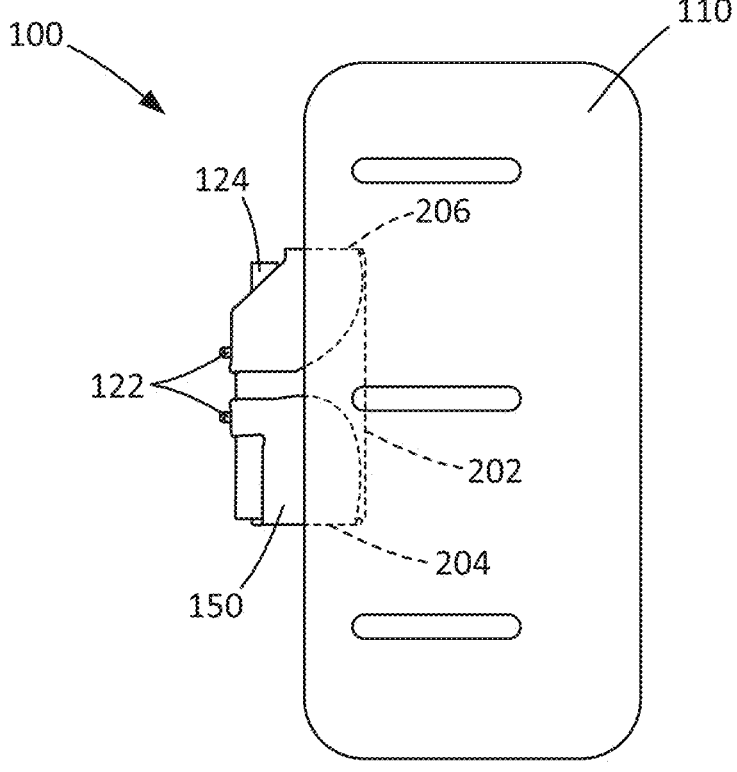
FIG. 5 is a plan view illustrating how the side airbag deploys from the airbag module.

The side airbag 110 inflates under the pressure of the
inflation fluid from the inflator 120. As shown in FIG. 5, this
causes the soft cover 150 to open, e.g., along the tear seams
202, 204, 206 as the side airbag 110 inflates and deploys. For
purposes of illustration, the tear seams 202, 204, 206 are
shown in dashed lines in FIG. 5 because their opening, along
with deployment of the side airbag 110, would distort the
shape/configuration of the soft cover 150. The dashed lines
thus show the soft cover in a pre-deployment condition for
ease of identification of the tear seams 202, 204, 206, and for
the understanding of the functionality of the airbag module
100.

Referring again to FIG. 1, as the side airbag 110 continues
to deploy, it passes through the seat padding 52 and engages
the seat cover 50, causing it to open, for example, along one
or more tear seams. The side airbag 110 deploys through the
resulting opening in the seat cover 50, and through any
padding 52 behind which the airbag module 100 is installed,
to the desired position between the occupant 14 and the side
structure 20, as shown in FIG. 1. To pass through the
padding 52, the padding can be configured with an opening
or slot through which the side airbag 110 deploys.

The side airbag 110, when inflated, is positioned adjacent
the vehicle seat 40 and any occupant 14 of the seat. In the
example outboard-installed configuration of FIG. 1, the side
airbag 110 extends along the side structure 20 of the vehicle
12 and is positioned between the side structure and the
occupant 14 of the vehicle seat 40. The side airbag 110
covers portions of the vehicle side structure 20 adjacent the
seat 40, such as pillars, doors, windows, etc. The side airbag
110, when inflated, helps to protect the vehicle occupant 14
from impacts with the side structure 20 in the event of a
vehicle rollover or a side impact to the vehicle 12. The side
airbag 110, when inflated, also helps to absorb the energy of
occupant impacts with the airbag and helps to distribute the
impact energy over a large area of the airbag.

The soft cover 150 helps protect the rolled/folded airbag
110 from damage that can result from objects that might
come into direct contact with the airbag module 100, for
example, during packaging, shipping, or installation. The
soft cover 150 envelopes the rolled/folded side airbag 110
and protects it from contact with external objects. Advan-
tageously, the soft cover 150 is also configured to help
protect the side airbag 110 from contact with internal
objects, i.e., the inflator 120. This can be especially impor-
tant because damage from contact from these internal
objects might go undetected, as it cannot be viewed due to
the soft cover 150 enveloping the packaged side airbag 110.
For example, the side airbag 110 could be damaged by
impacting with the inflator 120 (e.g., impacting the connec-
tor housing 128) if the airbag module 100 was dropped or
bumped during shipping, handling, or installation.

Advantageously, the third flap 180 is configured to pro-
vide this additional level of protection to the side airbag 110.
The electrical connector 124, being received in the inflator
receiving opening 184, is isolated from the packaged side
airbag 110. The third flap 180 thus serves as an absolute
barrier between the electrical connector 124 and the side
airbag 110, especially with the edge of the connector housing. The third flap 180 is configured so that the stud
receiving opening 186 being fitted over the inflator mount-
ing stud 122 retains the inflator receiving opening 184 fitted
over the electrical connector 124, blocking its removal
therefrom. The third flap 180 therefore protects the side
airbag 110 from damage even if the airbag module 100 is
dropped or otherwise mishandled.

From the above description of the invention, those skilled
in the art will perceive improvements, changes and modi-
fications. Such improvements, changes and modifications
within the skill of the art are intended to be covered by the
appended claims.

Having described the invention, the following is claimed:

1. A soft cover for packaging an assemblage of an inflator
and a side airbag in a stored condition to form an airbag
module for installation in a vehicle, the soft cover being
formed as a sheet of material comprising a central portion
configured to form a loop that encircles the inflator and side
airbag, and a first end portion that extends from the central
portion, the first end portion being configured to wrap over
the inflator and side airbag, closing a first open end of the
loop formed by the central portion, wherein the first end
portion comprises an inflator connector opening configured
to be fitted over a connector housing of the inflator that
houses one or more electrical connectors configured to
facilitate connecting the inflator to wiring from an airbag
controller, leaving the inflator connector housing exposed
outside the airbag module.

2. The soft cover recited in claim 1, further comprising a
second end portion extending from the central portion,
opposite the first end portion, the second end portion being
configured to wrap over the inflator and side airbag, closing
a second open end of the loop formed by the central portion,
opposite the first open end of the loop formed by the central
portion.

3. The soft cover recited in claim 2, wherein the central
portion comprises a first flap and a second flap, the first and
second flaps being configured to wrap around the inflator
and side airbag in opposite directions so that the central
portion forms the loop that encircles the inflator and side
airbag, wherein the first flap comprises a mounting stud
opening configured to be fitted over an inflator mounting
stud to secure the first flap to the airbag module, and wherein
the second flap comprises a mounting stud opening config-
ured to be fitted over an inflator mounting stud to secure the
second flap to the airbag module.

4. The soft cover recited in claim 3, wherein the inflator
includes a pair of mounting studs, and the first and second
flaps each include a tab portion and a pair of mounting stud
openings that extend through the tab portion, the mounting
stud openings being configured to be fitted over the mount-
ing studs with the tab portions overlying each other to secure
the loop formed by the central portion to the assemblage of
the inflator and side airbag.

5. The soft cover recited in claim 3, wherein the first end
portion comprises a third flap configured to wrap over the
inflator and side airbag, closing the first open end of the loop
formed by the central portion, the third flap comprising a
mounting stud opening configured to be fitted over an
inflator mounting stud to secure the third flap and to prevent
the inflator connector opening of the third flap from being
removed from the connector housing.

6. The soft cover recited in claim 5, wherein the third flap
comprises a tab portion through which the mounting stud
opening extends.

7. The soft cover recited in claim 5, wherein the second
end portion comprises a fourth flap configured to wrap over the inflator and side airbag, closing the second open end of the loop formed by the central portion, the fourth flap comprising a mounting stud opening configured to be fitted over an inflator mounting stud to secure the fourth flap.

8. The soft cover recited in claim 7, wherein the fourth flap comprises a tab portion through which the mounting stud opening extends.

9. The soft cover recited in claim 7, wherein the third and fourth flaps each comprise a curved upper edge extending from the central portion and curving down toward their respective mounting stud openings.

10. The soft cover recited in claim 1, wherein the soft cover comprises one or more tear seams that extends across the central portion of the soft cover, along a boundary between the central portion and the first end portion, and along the boundary between the central portion and the second end portion.

11. The soft cover recited in claim 1, wherein the central portion comprises one or more cutouts configured to leave the inflator connector housing exposed from the loop that encircles the inflator and side airbag to facilitate fitting the inflator connector opening of the first end portion onto the inflator connector.

12. The soft cover recited in claim 1, wherein the airbag comprises a mouth portion in which the inflator is installed, a central portion corresponding to the length of the inflator, an upper portion extending above the central portion, and a lower portion extending below the central portion, wherein the upper and lower portions, in the stored condition, are rolled and/or folded toward the central portion, and wherein the central portion and the rolled and/or folded upper and lower portions are rolled and/or folded toward the inflator to place the side airbag in the stored condition.

13. A side airbag module comprising:
a side airbag;
an inflator; and
the soft cover recited in claim 1;
wherein the central portion forms a loop that encircles the inflator and side airbag, the first end portion wraps over the inflator and side airbag with the inflator connector opening fitted over the connector housing of the inflator, leaving the inflator connector housing exposed outside the airbag module.

14. The side airbag module recited in claim 13, further comprising a diffuser secured to the inflator, wherein the loop of the central portion also encircles the diffuser, and the first end portion wraps over the inflator and diffuser.

15. The side airbag module recited in claim 13, wherein the inflator comprises mounting studs configured to mount the side airbag module to a vehicle seat.

16. A vehicle safety system comprising the airbag module of claim 13, a sensor for sensing vehicle conditions, and a controller that is operative to receive a signal from the sensor that is indicative of the sensed vehicle conditions, the controller being configured to evaluate the signal from the sensor to identify vehicle crash conditions and to control the actuation of the inflator to inflate and deploy the side airbag in response to the identified vehicle crash conditions.

17. The vehicle safety system recited in claim 16, wherein the airbag module is configured to be mounted in a seatback of a vehicle seat.

\* \* \* \* \*